Sept. 2, 1930. C. H. PARSONS ET AL 1,774,610
ELECTROTHERMAL TREATMENT OF CHEESE
Filed June 29, 1927 2 Sheets-Sheet 1
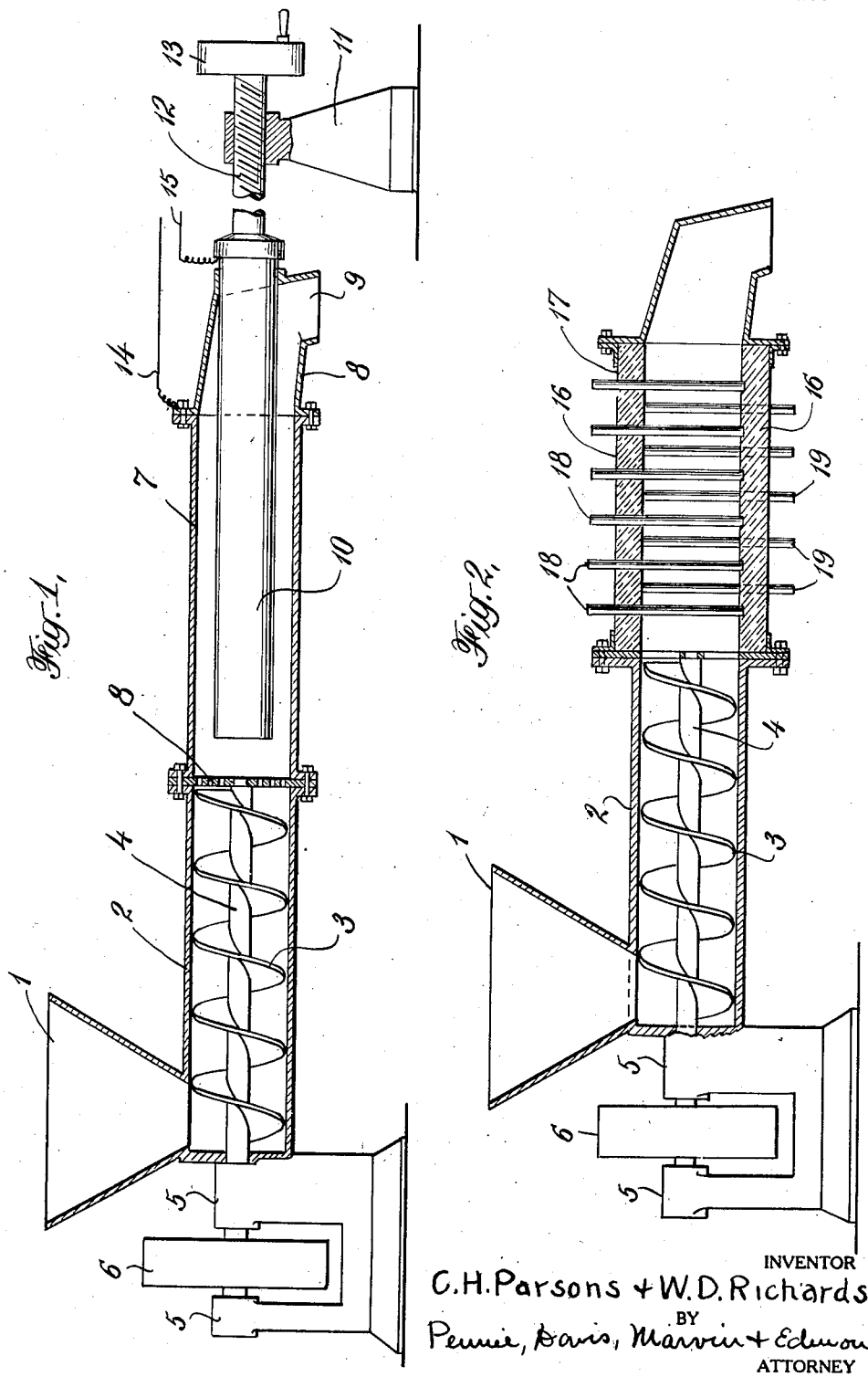
INVENTOR
C.H. Parsons + W.D. Richardson
BY
Pennie, Davis, Marvin + Edmonds
ATTORNEY

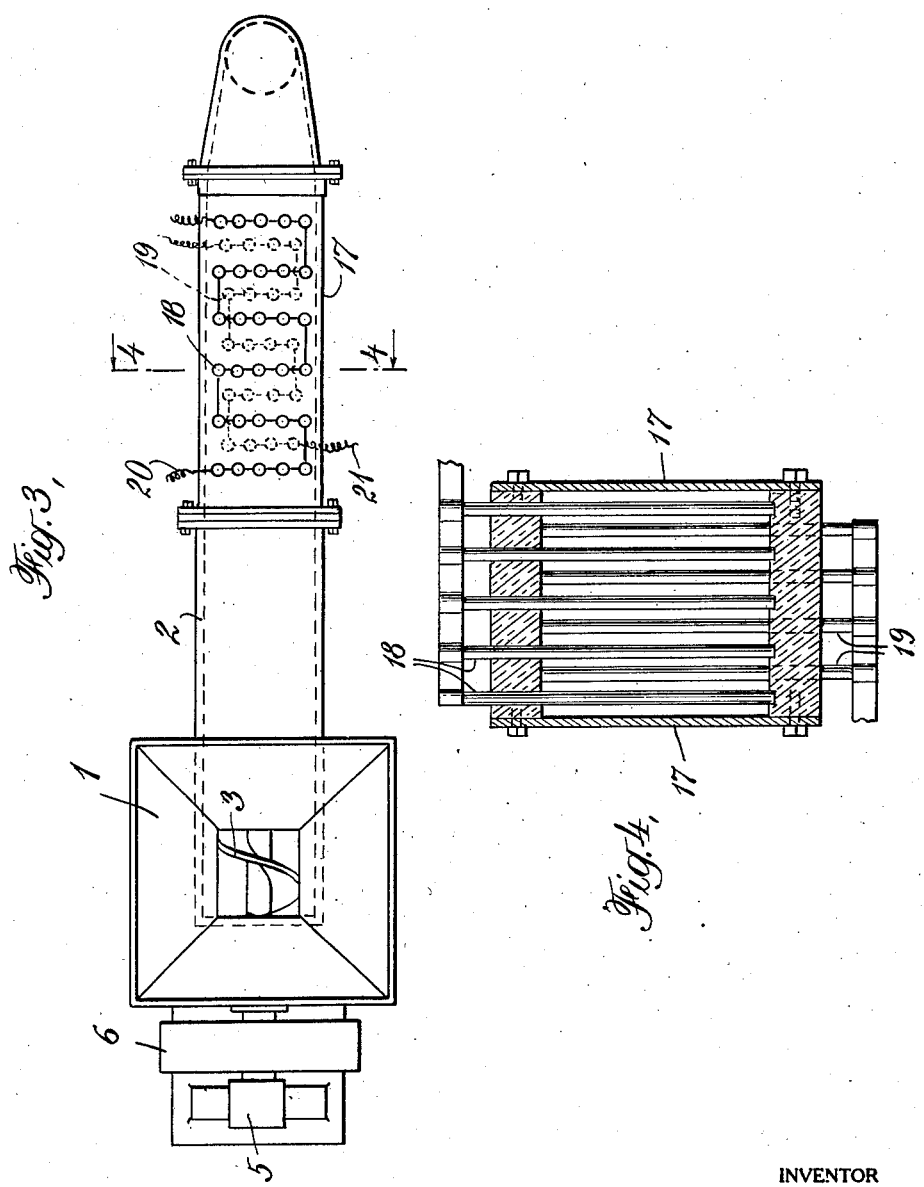

Patented Sept. 2, 1930

1,774,610

UNITED STATES PATENT OFFICE

CLINTON H. PARSONS AND WILLIAM D. RICHARDSON, OF CHICAGO, ILLINOIS, ASSIGNORS TO SWIFT & COMPANY, OF CHICAGO, ILLINOIS, A CORPORATION OF ILLINOIS

ELECTROTHERMAL TREATMENT OF CHEESE

Application filed June 29, 1927. Serial No. 202,224.

Our invention relates to a process of pasteurizing cheese electro-thermally, and more particularly to a continuous process of pasteurizing or sterilizing cheese in which the electric current is passed through the cheese being treated.

An object of the invention is to provide a method of pasteurizing cheese in which local overheating is avoided.

A further object is the provision of a method of pasteurizing cheese by means of which the product is more uniformly treated whereby a pasteurized cheese is obtained that will keep longer under ordinary storage conditions.

While the process is applicable to many kinds of cheese, it may be practiced to advantage with hard cheese such as Cheddar, Swiss, brick, and blends thereof, which have been previously emulsified. Heretofore cheese has been emulsified by melting and heating preferably with an emulsifying agent. In our prior Patent No. 1,522,383 we have disclosed and claim a process of emulsifying cheese at low temperatures under pressure. Cheese so emulsified can be pasteurized in a continuous manner as disclosed in our prior Patent No. 1,522,384.

In the batch method of pasteurizing cheese by heating and agitating, it is necessary to maintain a high temperature in the jacket of the kettle by means of steam pressure. In kettles large enough to hold batches of 350 to 400 pounds of cheese, a steam temperature of from 250 to 260 degrees is necessary to produce a mean low temperature sufficiently high to pasteurize the entire batch. This temperature results in a certain amount of overheating of portions of the cheese near the exterior of the kettle even though the average temperature of the entire mass of cheese is not brought above 140 to 150 degrees F. This overheating results in a cooked flavor being imparted to portions of the cheese.

In the present invention, the cheese is heated to pasteurize it by passing an electric current through the cheese as it flows through the pasteurizer. The cheese is heated by the resistance to the passage of the electric current which it supplies and thus the highest temperature that is obtained is in the body of cheese itself and such temperature is uniform throughout the cheese in the pasteurizer at a given time.

The process may be practiced without prior emulsifying but for best results we find it advisable to first emulsify the cheese preferably by the process disclosed in our prior Patent No. 1,522,383.

In addition to the advantage of operation at a lower temperature, the electro-thermal process of our invention also results in a considerable saving of time as the cheese may be pasteurized in from 20 to 40 seconds in most instances and in a period not to exceed one minute in all cases.

We preferably employ an alternating current, but a direct current can be employed if it is not maintained for too long a period. Cheese is fed by any ordinary feeding device into the electric heating chamber and the current is passed through the cheese as it moves progressively through the chamber between the electrodes. As the temperature can be controlled through the amount of current supplied and the time may be properly regulated all tendency toward local overheating may be avoided.

In the accompanying drawings, we have shown several forms of apparatus particularly useful in practicing the process and forming a part of the invention. In the drawings, Fig. 1 is a central, vertical, longitudinal sectional view of one type of apparatus employing a central cylindrical electrode;

Fig. 2 is a similar view of another form of apparatus showing a different type of electrodes;

Fig. 3 is a plan view of the apparatus shown in Fig. 2 and

Fig. 4 is a vertical sectional view through the pasteurizing chamber on the line 4—4 of Fig. 3.

In the drawings we have shown the apparatus provided with an emulsifier of the type disclosed in our prior Patent No. 1,522,383. As stated, the cheese to be pasteurized may be emulsified and is delivered to the emulsifier through a hopper 1. The cheese which is treated may be either blended or unblended cheese with or without additions such as pimento peppers, sage and other flavoring substances. In making a blended cheese, we first take cheese as received and proceed to grade it, if not already graded, according to kind, age and flavor, or if graded to regrade it. The cheese is then cut, each kind separately, into coarse blocks and ground in a grinder or hasher such for example as a hasher of the Enterprise type.

The emulsifier may be an apparatus such as an Enterprise hasher or the equivalent which is so constructed as to permit the desired emulsification to take place therein. As shown it consists of a cylindrical casing 2 having a helical screw 3 arranged therein. According to the process of our prior Patent No. 1,522,383, the emulsifier is rotated at a fairly rapid rate in order to accomplish emulsification. The rate of rotation will vary with the size of the machine and may be from 500 to 600 R. P. M. for large machines or 1,000 to 1,200 R. P. M. for small machines. As shown the helical screw is mounted on a shaft 4 which projects from the end of the casing through bearings 5 and is provided with a drive pulley 6.

From the emulsifying chamber 2 the cheese passes into a pasteurizing chamber 7. The pasteurizing chamber is formed of metal or other suitable electric conducting material. A perforated plate 8 may be arranged between the emulsifying chamber and the pasteurizing chamber to place a back pressure on the cheese being fed through the emulsifier. Suitable insulation (not shown) may be arranged between the adjacent ends of the emulsifying chamber and the pasteurizing chamber. The opposite end of the pasteurizing chamber is provided with a spout 8, preferably formed of non-conducting material, or suitably insulated from the metal wall 7, and provided with an outlet opening 9. A cylindrical electrode 10 is arranged within the pasteurizing chamber. This electrode is formed of a suitable conducting material and may be in the form of a solid rod or hollow tubular member. The projecting end of the electrode may be supported in a bearing or stand 11 having an internally threaded opening for the reception of a threaded shank 12 formed on or secured to the electrode. An adjusting handle 13 is arranged on the outer end of this shank. An electrical circuit is completed through the pasteurizer by means of lead wires 14 and 15 connected to the outer wall of the pasteurizing chamber and to the electrode respectively.

In the form of the apparatus shown in Figs. 2 to 4 of the drawings, the pasteurizing chamber is provided with top and bottom walls 16 of insulating material connected by side plates 17 of any suitable material such as metal. Two series of electrodes 18 and 19 are arranged in the pasteurizing chamber. The electrodes 18 project through the top and have their lower ends supported in the bottom wall. Similarly, the electrodes 19 project through the bottom and have their upper ends inserted in the top of the pasteurizing chamber. A lead wire 20 is connected to the upper electrodes and these electrodes are connected to each other. The opposite side of the circuit is connected to the lower electrodes by wire 21 and these electrodes are similarly connected to each other as shown in Fig. 3 of the drawings.

In carrying out the process in the apparatus shown in Fig. 1 of the drawings, the blended or unblended cheese suitably ground or comminuted is fed to the apparatus through the hopper 1 and as stated may be emulsified in the chamber 2. If the cheese is not to be emulsified the speed of the helical screw 3 is properly regulated to merely feed the cheese through the pasteurizing chamber. In either case the cheese is continuously fed through the chamber 7 and as stated the speed is so regulated that the cheese will require from 20 to 40 seconds, or at the most, one minute, to pass the pasteurizing chamber. In flowing through the pasteurizing chamber, the cheese completes the electric circuit between the casing 7 and the electrode 10 acting as a conductor of the second class. The current passing through the cheese generates heat by the resistance which the cheese offers to its passage and the cheese is thus heated to the proper temperature for pasteurizing. As the current is equally distributed throughout the cheese in the pasteurizer, the cheese is uniformly heated resulting in better pasteurization than has heretofore been obtained and at a lower temperature. As the current supply may be easily regulated the process is susceptible of perfect control.

In the apparatus shown in Figs. 2 to 4 of the drawings, the operation is essentially the same. Current is supplied by the lead wires 20 and 21 and passes from the electrodes 18 to the electrodes 19, or vice versa, through the body of cheese.

The same uniformity of heat and regulation of the degree of heat may be obtained in this form of the invention.

In practicing the process in either form of the invention, an alternating current of from 30 to 220 volts is employed and the average current density in ordinary practice varies from one-half to 10 amperes per square inch.

As stated the electric pasteurizing of the cheese may be practiced either with or without prior emulsification and the present invention includes both the process of pasteurizing cheese by passing an electric current through the cheese and the combined process of emulsifying and pasteurizing by means of an electric current.

In our companion application Serial No. 202,223 we have described and claimed the pasteurizing of cheese in the form of batches or masses of the cheese which are heated to the pasteurizing temperature by passing an electric current through the cheese mass. The present application is generic in character and claims more particularly a continuous method of pasteurizing in which the cheese is continually passed through the pasteurizer and heated therein by electrical heat to the pasteurizing temperature.

We claim:

1. The method of pasteurizing cheese which comprises forcing a solid plastic mass of cheese under pressure continuously between opposite electrodes and heating the cheese to a pasteurizing temperature by passage of electrical current through it between said electrodes whereby the cheese is rapidly and uniformly heated to the pasteurizing temperature while being maintained under pressure.

2. The method of pasteurizing cheese which comprises emulsifying the cheese under pressure at a temperature below that of pasteurizing to form a plastic body of the cheese, forcing such cheese under pressure between opposite electrodes and heating and melting the cheese while maintaining it under pressure by passing a current through it between said electrodes whereby the cheese is rapidly and uniformly heated to the pasteurizing temperature while being maintained under pressure.

In testimony whereof we affix our signatures.

CLINTON H. PARSONS.
WILLIAM D. RICHARDSON.